United States Patent [19]

Schuon

[11] 4,068,172
[45] Jan. 10, 1978

[54] METHOD OF AND MEANS FOR MEASURING DISTORTION OF BINARY AND TERNARY SIGNALS

[75] Inventor: Eberhard Schuon, Eningen, Germany

[73] Assignee: Wandel u. Goltermann, Reutlingen, Germany

[21] Appl. No.: 690,524

[22] Filed: May 27, 1976

[30] Foreign Application Priority Data

May 27, 1975   Germany ............................ 2523320

[51] Int. Cl.² .................... G01R 27/28; G01R 29/02
[52] U.S. Cl. ................................ 324/102; 324/57 R; 328/132
[58] Field of Search ............... 324/102, 57 R, 57 DE; 332/9; 329/50; 328/132

[56] References Cited

U.S. PATENT DOCUMENTS 2,532,338  12/1950  Schlesinger ........................... 329/50
3,327,219  6/1967  Cunningham ......................... 329/50

*Primary Examiner*—John Kominski
*Assistant Examiner*—Ernest F. Karlsen
*Attorney, Agent, or Firm*—Karl F. Ross

[57] ABSTRACT

Bipolar signals used in binary or ternary data transmission, arriving at a receiving station, are periodically sampled under the control of sync pulses extracted from the incoming data train. The samples are rectified and stored on a capacitor whose voltage variations, upon rectification and integration, yield an indication of signal distortion during transmission. The average capacitor charge furnishes a feedback signal for keeping the voltage variations proportional to signal amplitude. A threshold circuit prevents the sampling of zero or near-zero voltages with ternary signaling.

10 Claims, 6 Drawing Figures

METHOD OF AND MEANS FOR MEASURING DISTORTION OF BINARY AND TERNARY SIGNALS

FIELD OF THE INVENTION

My present invention relates to the measurement of distortions of bipolar signals of nominally constant amplitude, such as pulses used in binary or ternary data transmission, sent over a signaling path either directly or via a high-frequency carrier, e.g., by amplitude modulation and demodulation.

BACKGROUND OF THE INVENTION

It is well recognized in the art that such signals are subject to distortions due to the different laws of variation of attenuation and group delay with frequency. A measure of such distortion is given by the peak-to-average (PAR) ratio of a test pulse specially transmitted for this purpose, e.g., as described in an article entitle *The PAR Meter: Application in Telecommunications Systems* by John H. Fennick, *IEEE Transactions on Communication Technology*, Vol. Com-18, No. 1, February 1970, pp. 68 to 73. A simple way of determining the extent of such distortion is with the aid of a so-called eye pattern, e.g., as discussed in the book *Data Transmission* by Davey Bennett, McGraw-Hill Book Co., 1965, pp. 118 to 121, chapter 7-7. The eye pattern is a trace formed on an oscilloscope screen by samples periodically taken from an incoming data train, under the control of sync pulses extracted therefrom; a succession of pulses of the same polarity establishes the outer limits of the pattern whereas a changeover between positive and negative pulses results in distortions determining the thickness of the trace. Thus, the height of the free area within that trace is indicative of the quality of transmission.

OBJECT OF THE INVENTION

An object of my present invention is to provide a method of measuring the distortion of bipolar signals, as defined above, without the need for relatively expensive equipment such as an oscilloscope. A related object is to provide a simple circuit arrangement for this purpose.

SUMMARY OF THE INVENTION

In accordance with my present invention, synchronizing pulses recurring at bit frequency are extracted from an incoming data train and are used to control the periodic sampling of that train, with a certain delay depending on the pulse width, the resulting samples being rectified and stored on a capacitor whose voltage thus varies to a degree determined by the distortions introduced during transmission. These voltage variations are rectified and integrated to yield an indication of that degree of distortion which may be used for the manual or possibly the automatic control of a conventional equalizer, e.g. one of the type described in commonly owned U.S. Pat. Nos. 3,743,957 or 3,753,140. With proper equalization, of course, the reading of the distortion indicator will be at a minimum.

In order to make that reading proportional to the average amplitude of the received data pulses, a feedback signal may be derived from the average capacitor charge to control, for example, the gain of a balanced amplifier delivering the message samples to a half-wave or full-wave rectification circuit.

If the incoming data signal is of the ternary type with three distinct voltage levels $+V$, zero and $-V$, e.g., in conformity with the well-known AMI code, the intermittent occurrence of samples of zero or near-zero level would prevent the correct registration of the distortion effective at the peaks. It is therefore desirable in such instances, pursuant to a further feature of my invention, to suppress all samples of less than a predetermined threshold voltage in the input of the integrating and rectifying network feeding the indicator.

BRIEF DESCRIPTION OF THE DRAWING

The above and other features of my invention will now be described in detail with reference to the accompanying drawing in which.

SPECIFIC DESCRIPTION

Figure 1:
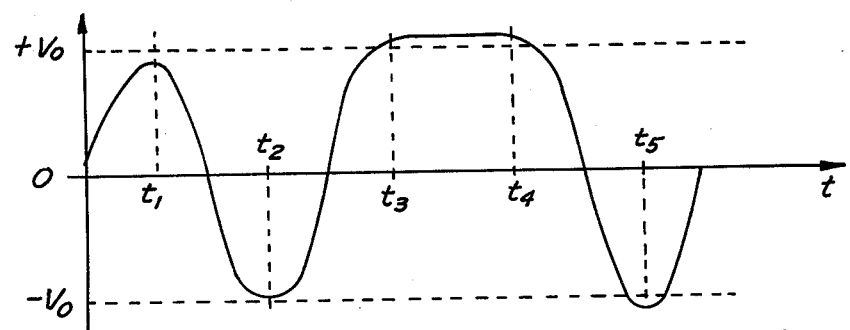
FIG. 1 is a graph showing a typical bipolar signal received with a certain distortion.
Figure 2:
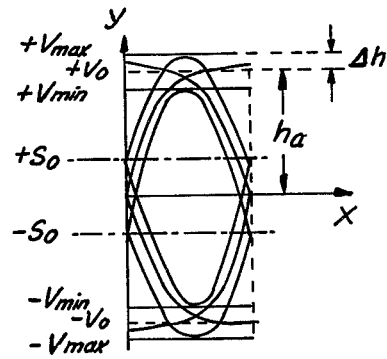
FIG. 2 is a diagrammatic representation of an eye pattern obtainable from the signal voltage shown in FIG. 1.

In FIG. 1 I have shown part of a distorted data train whose bipolar pulses vary generally between two levels $+V_o$ and $-V_o$ which are symmetrical about a zero level 0. The voltage peaks, which are all of the same magnitude at the transmitting end and are therefore of nominally constant amplitude, have absolute values differing from one another upon arriving at a receiving station. If these distorted pulses are sampled at their peaks, i.e. at times $t_1 - t_5$, the feeding of the samples to the y-deflection circuit of an oscilloscope (whose sweep in the $x$ direction is timed by extracted sync pulses) gives rise to an eye pattern as illustrated in FIG. 2. The trace of the eye pattern has a thickness which, along its vertical line of symmetry, extends between two positive voltage levels $+V_{max}$, $+V_{min}$ and between two negative voltage levels $-V_{max}$, $-V_{min}$. The average pulse amplitude, measured between levels $+V_o$ (or $-V_o$) and O, has been designated $h_a$; the ratio $\Delta h/h_a$, where $\Delta h$ is the difference between this average amplitude and the maximum (or minimum) amplitude, is a measure of the degree of distortion and conversely of the quality of the transmission path used, e.g., a telephone channel.

Figure 3:
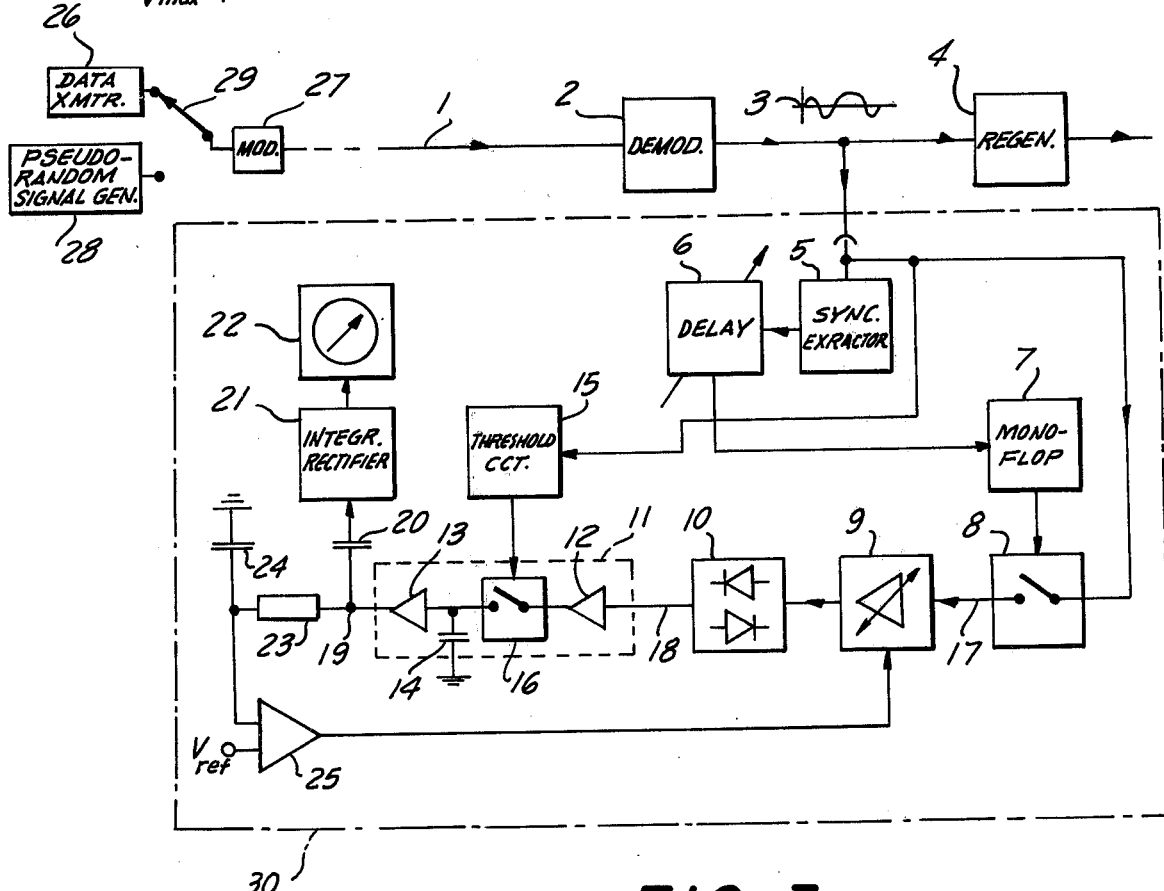
FIG. 3 is a circuit diagram of a distrotion-measuring system according to my invention.

Reference will now be made to FIG. 3 showing my improved distortion-measuring system. A signal path 1 carries bipolar signals from a transmitting station, including a data transmitter 26 and a modulator 27, to a receiving station comprising a demodulator 2 and a pulse regenerator 4; the latter feeds a nonillustrated reproducer for the transmitted data, such as digit printer. A switch 29 allows the substitution, for test purposes, of a pseudo-random signal generator 28 for the transmitter 26.

The output of demodulator 2 is a distorted pulse train 3 as shown in FIG. 1. A distortion detector 30, in parallel with regenerator 4, receives the pulse train 3 at a snyc-pulse extractor 5 and at a switch 8. Extractor 5 recovers the bit frequency from the incoming data pulses and, via an adjustable delay circuit 6, delivers the reconstituted sync pulses to a monoflop 7 controlling the periodic closure of switch 8. This closure, for a small fraction of a pulse cycle at times $t_1$, $t_2$ etc. (cf. FIG. 1), energizes a lead 17 extending to a balanced amplifier 9 of adjustable gain. The output signal of amplifier 9, after full-wave rectification in a bridge circuit 10, appears on an input lead 18 of another amplifier 12 forming part of a sample-and-hold circuit 11; amplifier 12 works, through a switch 16, into a storage capacitor 14 included in circuit 11, this circuit also including a further amplifier 13 with an output lead 19. A coupling capacitor 20 connects lead 19 to an integrating rectifier 21 feeding a voltmeter 22, the capacitor 20 having the effect of high-pass filter by suppressing low-frequency variations in the charge of capacitor 14.

Output lead 19 is also connected to an integrating circuit comprising a series resistor 23 and a shunt capacitor 24, this integrating circuit suppressing short-term variations in the voltage of capacitor 14 so as to act as low-pass filter. An amplifier 25, with a first input connected to the junction of resistor 23 and capacitor 24 and with a second input energized by a fixed reference potential $V_{ref}$, serves as a voltage comparator and feeds back corrective signals controlling the gain of amplifier 9 in order to maintain the average voltage on lead 19 substantially constant.

Interrupter 16 is controlled by a threshold circuit 15 connected to the output of demodulator 2 in parallel with the switch 8. Threshold circuit 15 closes the switch 16 as long as the incoming signal 3 has an absolute value exceeding near-zero levels $\pm S_o$ as illustrated in FIG. 2. In this way, the operation of indicator 22 will not be significantly affected by sustained voltages of (theoretically) zero level in the case of ternary data signals. If only binary signals are to be received, elements 15 and 16 may be omitted with the output of amplifier 12 permanently connected across capacitor 14.

Figures 4, 5, 6:
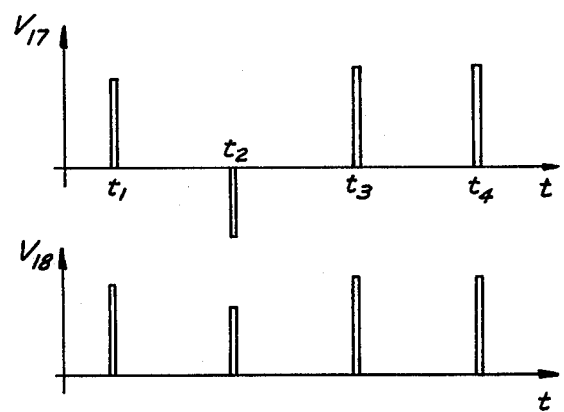
FIGS. 4, 5 and 6 are graphs relating to the operational system of FIG. 3.

FIG. 4 illustrates the voltage $V_{17}$ developed on lead 17, i.e. the sampled pulses derived from the wave 3 shown in FIGS. 1 and 3. FIG. 5 shows the same pulses after amplification and rectification, i.e. the voltage $V_{18}$ present on lead 18. FIG. 16 illustrates the resulting variations in the voltage of capacitor 14, after amplification at 13, representing a stepped voltage wave $V_{19}$ on lead 19. If no distortion were present, this voltage wave would be a straight line. Amplifier 25, in effect, responds to deviations of the means of voltage $V_{19}$ from voltage $V_{ref}$ and derives its corrective signals from these deviations.

It will be apparent that, with half-wave instead of full-wave rectification in circuit 10, the pulses of one polarity (e.g. negative) will be suppressed instead of inverted on passing from lead 17 to lead 18.

Coupling condenser 20 and integrating rectifier 21 constitutes a conventional detector for alternating voltages, i.e. the output of amplifier 13.

I claim:

1. A method of measuring the distortion of bipolar pulses of nominally constant amplitude in a data train arriving over a transmission path with a fixed bit frequency, comprising the steps of extracting said bit frequency from said data train, sampling said data train a said bit frequency substantially midway of said pulses, capacitively storing the resulting voltage samples, detecting variations in the stored voltage displaying the detected variations on an indicator, integrating the stored voltage to obtain its means value, and deriving corrective signals from changes in the integrated voltage to maintain said mean value substantially constant whereby the amplitude of said variations is kept proportional to said means value.

2. A method as defined in claim 1 wherein said voltage samples are subjected to rectification prior to storage.

3. A method as defined in claim 1 wherein said data train is of ternary charcter including pulses of approximately zero voltage, comprising the further step of suppressing all samples of an absolute magnitude less than a predetermined value.

4. A system for measuring distortion of bipolar pulses of nominally constant amplitude in a data train arriving over a transmission path, comprising:
synchronization-extraction means connected to said path for recovering a bit frequency from said data train;
capacitive storage means;
switch means controlled by said synchronization-extraction means for periodically delivering voltage samples from said data train to said storage means;
detector means connected to said storage means for energization by variations in the stored voltage;
indicator means connected to said detector means for registering the magnitude of said variations;
rectification means inserted between said switch means and said storage means;
a variable-gain amplifier upstream of said rectification means;
integrating means connected to said storage means; and
feedback means connected between said integrating means and said amplifier for varying the gain of said amplifier to maintain the mean value of said stored voltage substantially constant whereby the amplitude of said variations is kept proportional to said mean value.

5. A system as defined in claim 4, further comprising timing means responsive to sync pulses from said synchronization-extraction means for closing said switch means a predetermined period after each sync pulse.

6. A system as defined in claim 5 wherein said timing means comprises an adjustable delay circuit.

7. A system as defined in claim 4 wherein said rectification means comprises a full-wave rectifier.

8. A system as defined in claim 4 wherein said feedback means comprises a comparator inserted between said integrating means and said amplifier, said comparator having a reference input connected to a source of constant potential.

9. A system as defined in claim 4, further comprising interrupter means inserted between said rectification means and said storage means for controlling the delivery of said voltage samples thereto, and threshold means connected to said transmission path for opening said interrupter means in the presence of incoming signal voltages of an absolute value less than a predetermined minimum level.

10. A method as defined in claim 1 wherein said corrective signals are generated in response to deviations of said integrated voltage from a predetermined reference voltage.

* * * * *